Patented Nov. 24, 1931

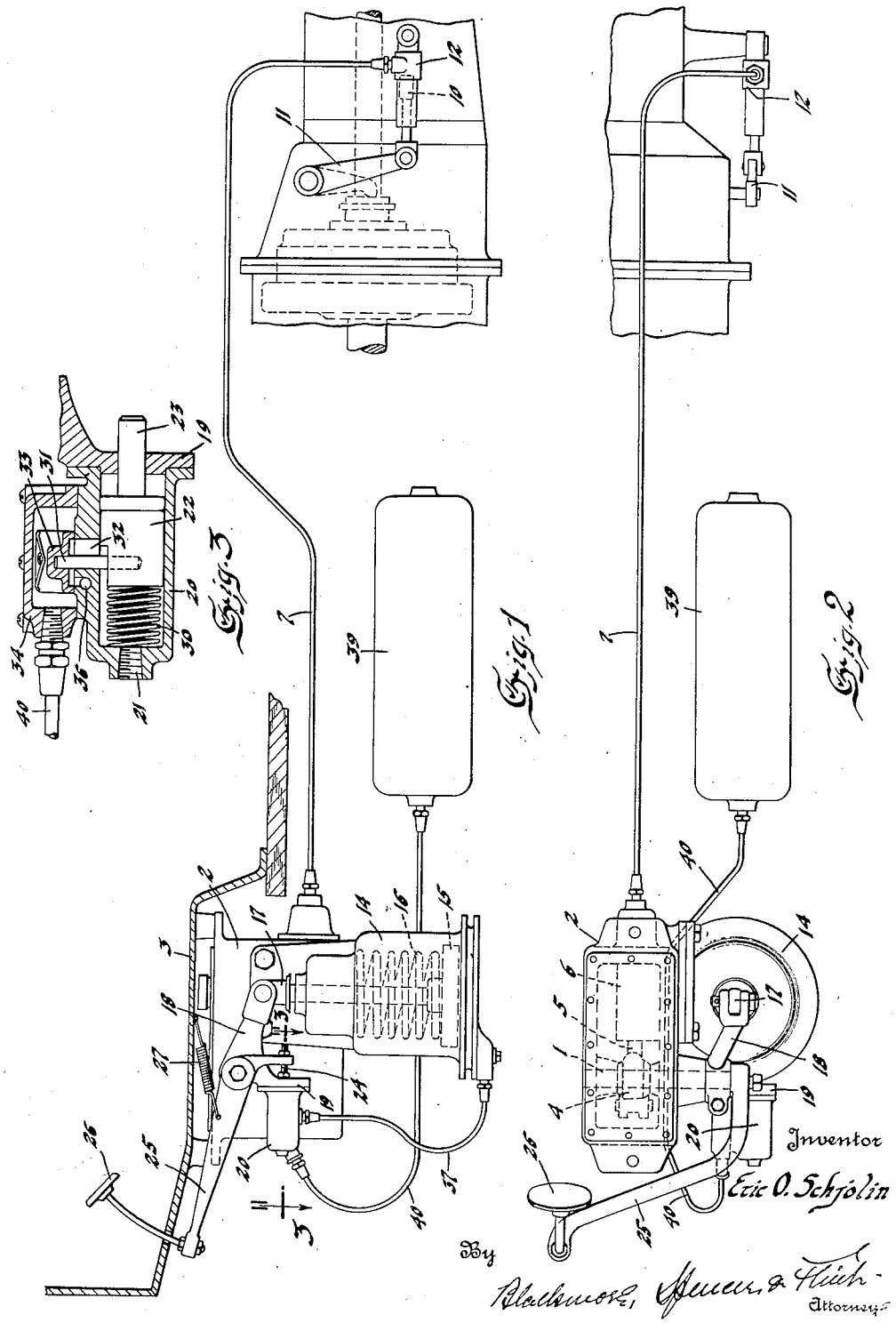

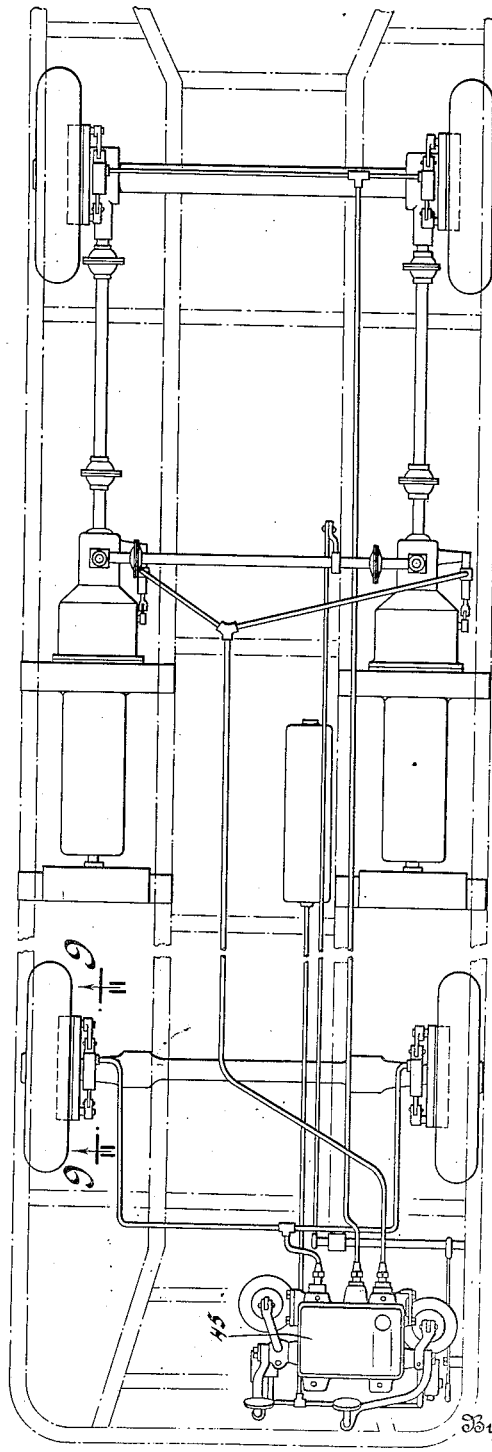
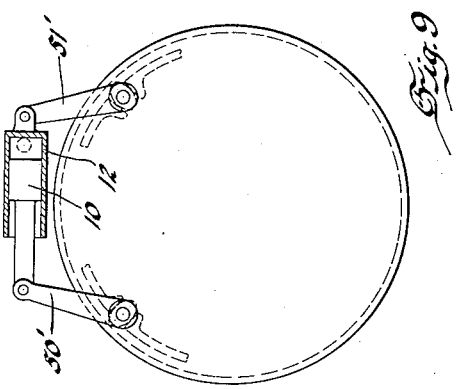
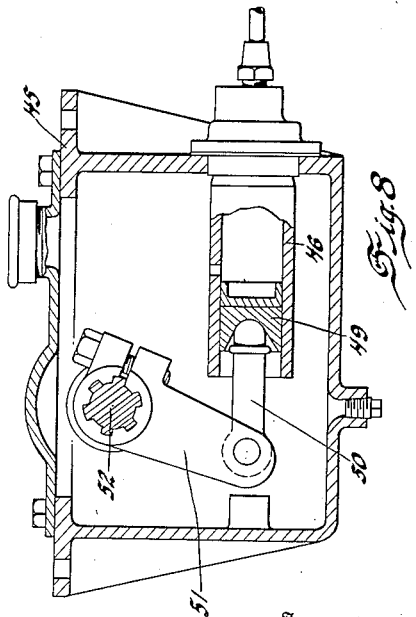

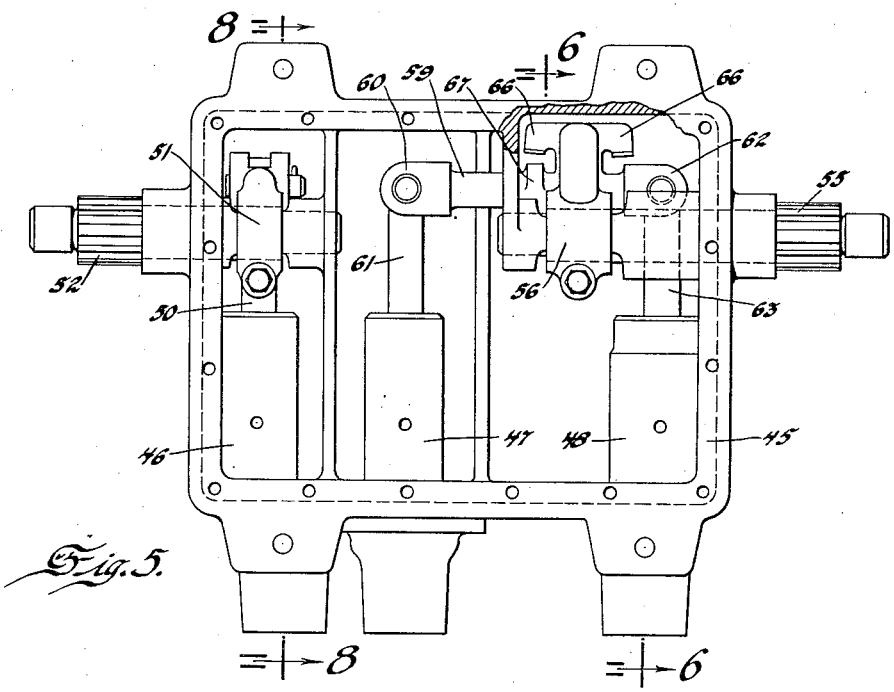

1,833,438

UNITED STATES PATENT OFFICE

ERIC OLLE SCHJOLIN, OF BIRMINGHAM, MICHIGAN, ASSIGNOR TO YELLOW TRUCK & COACH MANUFACTURING COMPANY, OF PONTIAC, MICHIGAN, A CORPORATION OF MAINE

CLUTCH OPERATING MECHANISM

Application filed October 25, 1929. Serial No. 402,470.

This invention relates to power actuating mechanism for controlling the operation of certain parts of a vehicle, or the like. While its application and use is not limited, the invention is especially intended for embodiment in heavy duty motor vehicles, such as passenger coaches, buses, and trucks to govern the operation of clutch, brake, or other mechanisms, and for the purpose of disclosure will be so referred to herein.

When such mechanisms are manually operated through foot pedals, as is usually the case, it takes a great deal of effort on the part of the operator to push on the pedals, and the range of pedal movement is quite large. To relieve the driver from tiring strains incident to keeping large heavy vehicles under control and to provide improved power operating mechanism that will respond instantly and require but little manual effort through a small range of pedal movement, is one of the primary objects of the present invention.

To this end there is contemplated the provision of an hydraulic system for actuating the part or parts to be operated, and a pneumatic power apparatus under control of the driver through the mere opening and closing of a suitable valve to govern the action of the hydraulic system. The driver, therefor, exerts but little effort, while a positive and quick action is insured.

The invention and its features of advantage will be better understood upon reference to the accompanying drawings illustrating a preferred but not necessarily the only embodiment of the invention as applied to a type of vehicle recently introduced to the public, wherein two engines or power plants are mounted midway of the vehicle, one on each side and operatively connected with a rear wheel for propelling the vehicle, the driver or operator being located in a forward corner of the body and governing engine operation and vehicle movement through suitable remote controls.

In the drawings:

Figure 1 is a side elevation of the mechanism for operating a clutch.

Figure 2 is a top plan view of the parts shown in Figure 1.

Figure 3 is a detail section view of the air pressure valve, and is taken on line 3—3 of Figure 1.

Figure 4 is a top plan view of the running gear of a motor vehicle controlled by the mechanism forming the present subject matter.

Figure 5 is a top plan view of a liquid reservoir in which are located the pressure pumps.

Figure 6 is a sectional view taken on line 6—6 of Figure 5.

Figure 7 is a detail plan view of an equalizer device.

Figure 8 is a sectional view taken on line 8—8 of Figure 5.

Figure 9 is an elevational view looking in the direction of the arrows on line 9—9 of Figure 4.

Referring to the drawings, the numeral 1 indicates an operating rock shaft for the hydraulic system, having suitable bearings in a pump box or liquid reservoir 2 which may be mounted beneath the flooring 3 of the vehicle body. Secured on the rock shaft 1 within the housing 2 is a lever 4 connected through a rod 5 with a reciprocatory piston slidable in the pump cylinder 6. The pump cylinder is shown as being connected through a conduit or pipe 7, with a pressure responsive device of suitable construction and operatively connected with the part to be operated. For example, there is shown in Figures 1 and 2 a piston 10 connected at one end with a lever 11 for operating clutch throw-out mechanism, and slidable in a cylinder 12 which is pivotally connected to a fixed part of the clutch housing, or the like. It will be understood that the clutch is disengaged upon expansion of the piston 10 and cylinder 12 under the pressure of the oil or other liquid in the system sent through the line 7 by the pump within the storage reservoir 2.

While an hydraulic operating system is found to be positive and quick acting, it requires a great deal of effort to effect its operation. It is proposed, therefore, to utilize air or other fluid under pressure for working the hydraulic system, and to this end there is provided a pressure responsive device preferably comprising a cylinder 14 having therein a reciprocatory piston 15, provided with a return spring 16, the stem 17 of the piston being connected to one arm 18 of a bell crank lever keyed or fixed on the outer end of the operating shaft 1. The other arm of the bell crank lever has a lateral extension 19 carrying a valve housing 20 open at one end through a port 21 to atmosphere, and having slidable therein a piston 22 provided with a stem 23 that extends through the lateral projection 19, for engagement with an adjustable set screw 24 carried by a lever 25 loosely mounted on the shaft 1 and provided with a foot pedal 26 and a return spring 27. A compression spring 30, within the housing 20, tends to urge the piston 22 toward the set screw, and a pin 31 extending laterally from the piston 22 through an elongated slot 32 in the wall of the housing, engages with the plate or slide valve 33 enclosed within a cap or cover 34, to carry the valve with the piston. The underside of the valve 33 is depressed or grooved to place, through the slot 32 and port 21, a port or passageway 36 in the housing 20 in communication with atmosphere. This passageway 36 is connected through a pipe or conduit 37 with the piston cylinder 14.

When the valve 33 is slid off the port 36 upon the piston movement, it allows air under pressure from a storage tank 39 to flow through a conduit or pipe 40 connected with the cover 34, through the passageway 36 and conduit 37 to the piston cylinder to force the piston upward and rock the shaft 1 which, in turn, actuates the hydraulic pump. When the valve 33 is restored to original position, air pressure on the piston 15 is relieved and the piston is returned by the tension of its spring 16.

The normal position of the parts is that wherein the piston 15 is at the bottom of its stroke with air pressure thereon cut off at the valve and the piston cylinder open to atmosphere. This position is maintained so long as the set screw 24 is held in engagement with the stem 23, by the action of the spring 27 on the lever 25, the tension of which is of sufficient value to overcome the pressure of the spring 30 on the piston 22. When the operator depresses the pedal 26 and rocks the lever 25 against the tension of its spring 27, the set screw 24 is moved away from the stem 23, and then pressure of the spring 30 acting on the piston 22 opens the valve to allow air under pressure to act on the piston 15 which, as before pointed out, rocks the shaft 1 to bring about clutch disengagement. The extent of disengagement will be directly controlled by the degree of pedal movement since the movement of the bell crank lever 18 carries with it the valve housing 20, so that the stem 23 in effect follows up and makes contact with the set screw 24 at whatever point movement ceases in the range of pedal travel.

If desired, a stop or abutment may be provided on the bell crank 18 for engagement of the lever 25 after a predetermined range of relative movement, in which case the hydraulic system could be manually operated in the event of failure of the air pressure device. As shown in the drawings such stop or abutment may be constituted by the lateral extension 19 projecting beneath the lever 25.

It will be understood, that in the event two engines are to be employed, branches may lead from the pressure pump to pressure responsive devices at each clutch, in order that the two clutches may be simultaneously and concomitantly operated. This is illustrated in Figure 4, which also illustrates the application of the invention for controlling the brake mechanism of the vehicle. The particular type of brake mechanism forms no part of the present invention, but there is shown in Figure 9 a suitable arangement wherein two sets of internal expanding shoes are operated upon expansion of piston 10 and cylinder 12 connected with levers 50' and 51', respectively, on shafts carrying cams, one for each set of brake shoes.

For convenience and economy in manufacture, there may be provided at the front of the vehicle a liquid reservoir or box 45 common to each of the pump cylinders 46, 47 and 48. Within the pump cylinder 46, associated with the clutch mechanisms, is a piston 49 connected through the rod 50, with a swinging lever 51 keyed on a rock shaft 52 extending to one side of the housing and having associated therewith power operating mechanism such as heretofore referred to. A similar power device may be located on the opposite side of the housing 45 and operatively connected with the rock shaft 55, carrying a dependent lever 56 that is provided with a socket at its lower end in which is universally mounted and secured by a removable cap 57 the ball or enlarged spherical portion 58 intermediate the ends of a distributor bar or equalizer 59. A head 60, at one end of the equalizer bar, is connected by means of a rod 61 with a piston in the pump cylinder 47, while the head 62, at the opposite end of the distributor bar, is connected as by means of the rod 63, with a piston 64 slidable in the pump cylinder 48, the cylinder 47 being connected through suitable conduits with pressure responsive devices associated with the rear wheels, while the pump cylinder 48 is connected with pressure responsive devices associated with the front wheels. It will be understood that the relation between the universal mounting of the distributor bar and the connections with the respective piston rods may be arranged to divide the power between the front and rear brakes, according to any predetermined ratio. To limit the degree of angular movement of the distributor bar 59, the lever 56 may be provided with a pair of lateral wings or ears 66 for engagement with either the head 62 or a boss or enlargement 67 on the bar.

I claim:

1. In combination, a liquid receptacle, a pressure pump submerged in said receptacle and adapted to force the liquid to a part to be actuated, a rock shaft extending into said receptacle and having an operative connection with said pump, a rock lever fixed on said shaft exteriorly of the receptacle, a pressure responsive device connected with said lever to actuate the same, a valve mounted on said lever for bodily movement therewith, adapted to control the application of pressure on said device, and a manually operated lever loosely mounted on the rock shaft for pivotal movement thereon to control the action of said valve.

2. In combination, a liquid receptacle, a pressure pump submerged in said receptacle and adapted to force the liquid to a part to be actuated, a rock shaft extending into said receptacle and having an operative connection with said pump, a bell crank fixed on said shaft, a pressure responsive device operating on one leg of the bell crank, means on the other leg controlling the action of said device, and a second bell crank loosely pivoted on said shaft with one leg arranged for manual manipulation and the other leg operatively related to said control means for the actuation thereof.

3. In combination, a pump for forcing a liquid under pressure to a hydraulically operated part to be actuated, a rock shaft for operating said pump, a lever fixed on the shaft, a fluid pressure responsive device operatively connected with the lever, and control means for said device, including a valve housing mounted on said lever, a movable valve element within said housing, resilient means tending to move the valve element to a position to permit the fluid flow to said device, and a manually movable lever loosely pivoted on the rock shaft and provided with a part for abutment with said element to hold the same against movement under influence of said resilient means, whereby the pressure responsive device acts only when the abutment part is moved away from the valve element and until the valve housing follows up the movement and brings the valve element again into abutment with said part.

In testimony whereof I affix my signature.

ERIC OLLE SCHJOLIN.